United States Patent [19]

Hengelmolen

[11] Patent Number: 4,901,789
[45] Date of Patent: Feb. 20, 1990

[54] HEAT REGENERATORS

[75] Inventor: Adrianmus J. Hengelmolen, Dreumel, Netherlands

[73] Assignee: Copermill Limited, Nottingham, England

[21] Appl. No.: 170,748

[22] Filed: Mar. 21, 1988

[30] Foreign Application Priority Data

Mar. 26, 1987 [GB] United Kingdom ............... 8707277

[51] Int. Cl.$^4$ .................... F28D 17/00; F28F 27/02
[52] U.S. Cl. ........................... 165/101; 165/4; 165/7; 165/134.1; 432/180
[58] Field of Search ............... 165/142, 101, 10, 134.1, 165/7, 4; 432/180, 181, 182

[56] References Cited

U.S. PATENT DOCUMENTS

| | | | |
|---|---|---|---|
| 1,790,172 | 1/1931 | Smith et al. | 432/182 |
| 2,479,940 | 8/1949 | Kuhner | 165/134.1 |
| 2,692,131 | 10/1954 | Hasche | 165/10 |
| 3,061,194 | 10/1962 | Nichols et al. | 165/142 |
| 3,105,544 | 10/1963 | Brown Jr. | 165/142 |
| 4,738,309 | 4/1988 | Schilling | 165/101 |

FOREIGN PATENT DOCUMENTS 514345  11/1939  United Kingdom ............... 165/922

Primary Examiner—Albert W. Davis Jr.
Attorney, Agent, or Firm—Paul & Paul

[57] ABSTRACT

Exhaust gases are constrained to pass through a chamber with walls of heat retaining material. Air to be preheated is passed through pipes within the chamber the pipes transferring heat from the exhaust gases to the air or from the walls to the air when the walls have been preheated to a high temperature.

4 Claims, 4 Drawing Sheets

HEAT REGENERATORS

The present invention relates to heat regenerators and more particularly to heat regenerators for extracting heat from very hot exhaust gases from, for example, scrap reclamation furnaces.

The exhaust gases given off by strap reclamation furnaces are extremely hot and contain large quantities of contaminants and it is an object of the present invention to provide a heat regenerator which efficiently extracts heat from the exhaust gases for transfer to cold air for preheating the air and which is robust in construction and not susceptible to blockage by contaminant particles. It is also an object of the present invention to provide a heat regenerator with heat storage capacity for evening out the heat transfer process.

The present invention therefore provides a heat regenerator for extracting heat from hot exhaust gases and transferring the heat to air or other fluid which is required to be heated comprising a chamber through which the exhaust gases are constrained to pass, a pipe system within the chamber through which the air or other fluid to be heated is passed in which the chamber comprises at least one wall which is made from heat retaining material in which a single regenerator comprises at least two paths for the combustion air or other fluid the paths being selected alternatively by valve means and in which each path comprises a pipe system which at least partially passes through separate chambers in the regenerator.

In a first embodiment the pipes are wholly in separate chambers but in a second embodiment the paths cross over, each sharing a portion of a first and a second chamber.

Preferably the heat retaining material may be fire brick or heat resistant steel castings or any other heat resistant material and preferably the walls of the chamber are corrugated to accommodate the pipe system.

Preferably the pipe system is constructed from a series of pipe sections which are joined to form a continuous pipe. Each section preferably comprises an inner pipe member open at one end into an outer pipe member which outer pipe member at least within the chamber is constructed from heat resistant and heat conductive material.

Preferably in a regenerator a plurality of different grades of heat resistant and heat conductive material are used the highest grade for heat resistance being at the hot exhaust gas inlet end of the regenerator.

Embodiments of the present invention will now be described, with reference to the accompanying drawings, in which.

Figure 1:
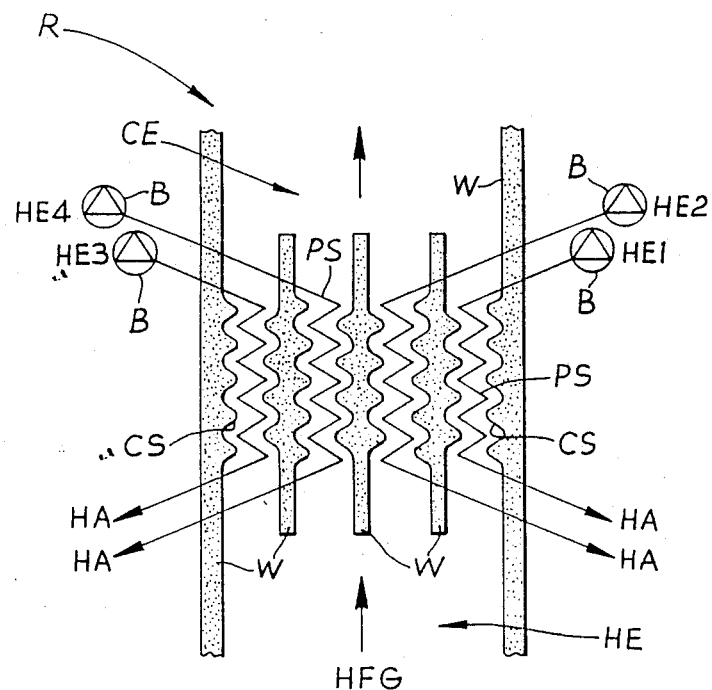
FIG. 1 shows diagrammatically the principle of the heat regenerator according to the present invention.

With reference now to FIG. 1 of the drawings the heat exchanger comprises a series of walls W of fire brick material or any heat resistant material such as steel castings with good heat retention properties and a plurality of heat exchange units HE1-HE4 each of which comprises a gas blower or water pump B and a heat exchange pipe section PS. For the purposes of the present invention it will be assumed that it is cold air which is to be preheated and is to be supplied for example to burners to be combusted with for example natural gas.

Each wall W is provided or formed with a corrugated surface CS to conform to the pipe section PS.

The operation of the exchanger is as follows. Hot waste gas HFG is blown (by a blower not shown) into one end of the heat exchanger and is confined by walls W to pass through and around pipe sections PS. Cold air is blown through one or more of the heat exchangers HE1-HE4 as required by the furnaces to which the heated air HA is to be fed as indicated by the arrows.

The cooler waste gases CFG are exhausted to a suitable chimney or gas cleaning plant (not shown) in known manner. The waste gases may for example be flue gases from an incinerator or other type of furnace.

Figure 4:
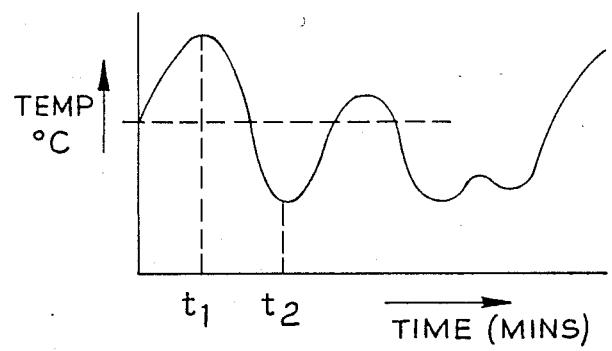
FIG. 4 shows a graph of flue gas temperature against time.

The operation can be explained with reference to FIG. 4 which shows a graph of hot waste temperature against time. For any incinerator or furnace the waste or flue gas temperature will rise and fall as the incinerator or furnace is loaded an heats up to operating temperature and this is shown by the undulating graph.

For the purposes of the present invention the waste gases will be assumed to be from a furnace. In a known regenerator when the waste flue gases are very hot as at t1 then the heated air HA will also be very hot but when the gases are colder as at t2 the air HA will be relatively cooler. This will probably be at a time when the air HA requires to be as hot as possible and thus additional fuel will be required to heat up the furnace again.

The walls of regenerator R in FIG. 1 are heated by the waste flue gas HFG as well as the pipes PS and especially if one or more of the pipes PS are not conveying cold air. Thus at for example time t1 when the furnace does not require large amounts of preheated air HA but is outputting very high temperature waste flue gases the walls W are being heated rapidly and this heat is stored by these walls.

At time t2 when for example the furnace has been loaded the flue gas temperature is low but when the gas is blown down the regenerator it will actually gain heat from the walls W and this heat will be transferred to the pipes PS by convection (and also by radiation if walls W are very hot) and the heated air HA will be at a very much higher temperature at time t2 than could be obtained from the exhaust gases without the preheated walls W.

Figure 2:
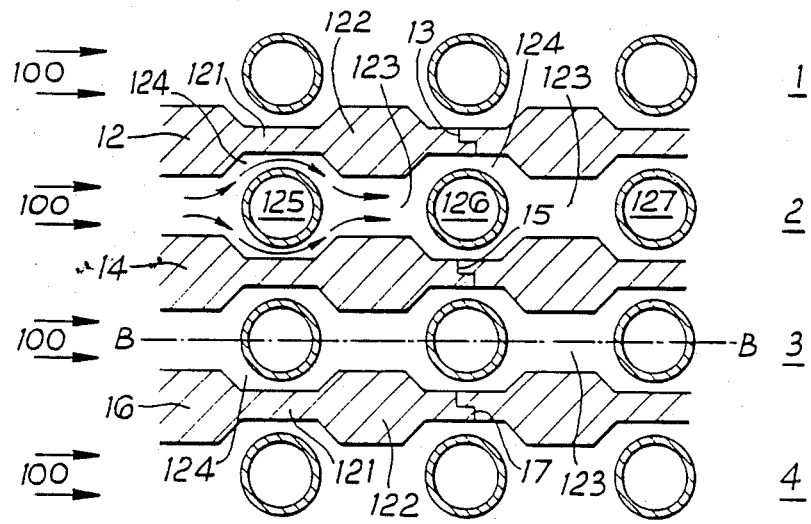
FIG. 2 shows in greater detail a heat regenerator according to the present invention in plan section along line A—A of FIG. 3.
Figure 3:
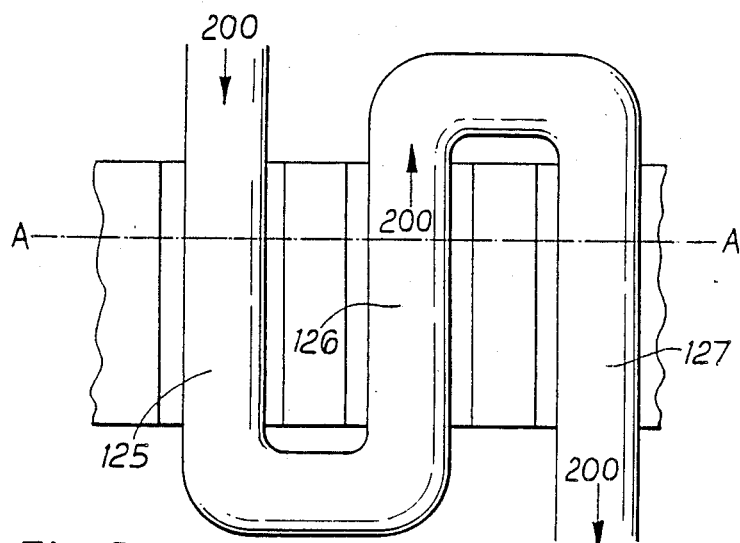
FIG. 3 shows the heat regenerator of FIG. 2 in elevational cross-section along line B—B of FIG. 2.

With reference now to FIGS. 2 and 3 of the drawings, the heat regenerator 10 comprises a series of elongate walls 12, 14, 16 made in interlocking or abutting sections as indicated by joint lines 13, 15, 17. The walls are preferably of fire brick or other heat retentive material of a very high heat retentive material such as used in electric storage heaters.

Each wall comprises a series of narrow sections 121 etc separated by a series of wider sections 122 making a series of constricted channels 123 and wider chambers 124. In each of the wider chamber 124 a heat transfer pipe 125, 126, 127 etc is positioned.

It may be seen that the parts are readily assembled into as large a heat regenerator as required. For the purposes of simplicity only three sections are shown and only three pipes (FIG. 3) are shown joined for heat transfer. In practice any number may be used. Thus in FIG. 2 four air heating paths are shown as indicated by the four levels 100 and one of these is shown in FIG. 3.

In FIG. 2 contaminated exhaust gases as indicated by arrows 100 are forced into the heat regenerator between respective walls 12 and 14 and 14 and 16 etc. These gases pass round pipes 125, 126, 127 etc heating the air as indicated by arrows 200 (FIG. 3) passing therethrough by suitable blowers B (FIG. 1). The gases are diverted by the pipes onto the walls 12, 14 of the regenerator and heat up the walls. They also deposit particles onto the walls but the clearances between pipes and walls can be substantial and therefore clogging is unlikely. By appropriate design easy cleaning will be possible by removal of sections of the walls W.

As described with reference to FIG. 1 the exhaust gases thus pass along the channels formed by the walls and both walls and pipes extract heat therefrom. If air flow 200 is great then a large amount of the heat in gases 100 will pass directly to the air 200. If air 200 is shut off for example because a furnace burner is not required then heat is not absorbed by the pipes but is absorbed by the walls. When air 200 is recommenced then heat can be extracted by the pipes not only from the exhaust gases 100 but also from the walls. If exhaust gases 100 are fairly cool due to start up of the furnace then they will gain heat from the walls and the pipes will receive greater heat.

Figure 5:
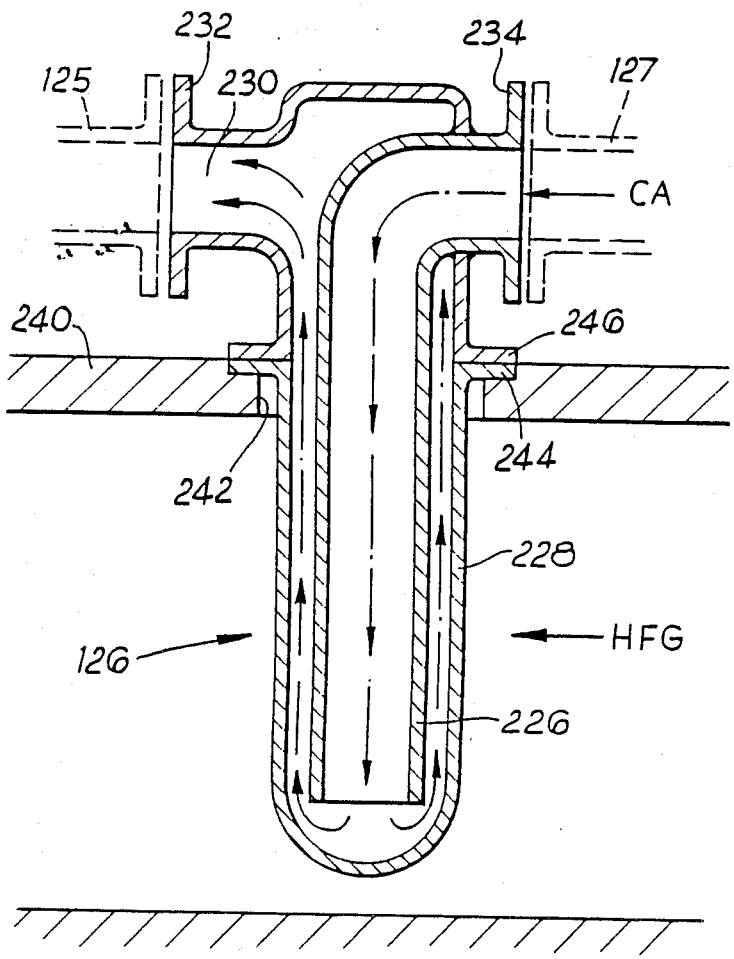
FIG. 5 shows an alternative design for the heat exchange pipes.

The pipework shown in FIG. 3 is functional but is not practical if maintenance of the regenerator is required without dismantling the regenerator. FIG. 5 illustrates a more practical design of the pipes 125, 126, 127 and shows one pipe—for example 126 in detail. Pipe 125 is shown completely and the positions of pipes 125 and 127 which are identical in construction to pipe 126 are shown in dotted outline.

Pipe 126 comprises an inner pipe 226 down which colder air CA is blown and an outer pipe 228 exposed on its outside surfaces to flue gases HFG and up which air CA flows to be heated and exhausted via outlet 230 to pass to the next pipe 125. The pipes are joined by flanges 232, 234 etc and therefore one pipe 126 can be removed by unbolting it from the adjacent pipes. The upper wall (or roof) of the regenerator is shown by solid member 240 and is provided with openings 242 to receive the pipes 126 etc.

Outer pipe 228 may be made in two parts a lower portion and an upper portion joined at flanges 244, 246 and this design has two advantages. Firstly it is easier to make the complex upper shape with pipe 226 being joined to pipe 228 at flange 234.

Secondly and more importantly the lower part of pipe 228 which is in the flue gas stream HFG can be replaced when it is eroded away without having to replace the whole pipe complex.

With reference also to FIG. 1 it is now possible to "grade" the pipes 228 with those at the hotter end HE where the hot flue gas HFG enters being made of a very high temperature resistant material and those at the cooler end CE being made of a lower temperature resistant material with a considerable cost saving. Several grades can be used in a long regenerator chamber.

Figure 6:
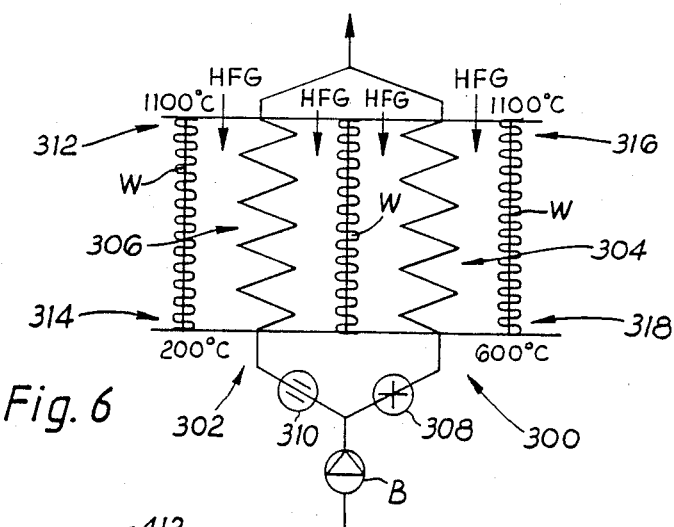
FIG. 6 shows, diagrammatically a portion of a second design of heat regenerator according to the present invention.

With reference now to FIG. 6 a portion of a second design of heat regenerator is shown. The portion comprises two sections separated by walls W (see FIG. 1) which are preferably constructed of fire brick or like material as described with reference to FIG. 2.

In the embodiment of FIG. 6 each heat exchange unit is split into two halves indicated by arrows 300 and 302. Each half is substantially identical and is mounted in a respective passage 304, 306 in the heat exchanger. Air is blown by a blower B either through 300 or 302 according to the position of valves 308, 310. As shown at present valve 308 is closed and valve 310 is open. The passage of hot flue gases HFG is indicated by the arrows.

The heat exchanger operates by alternately opening valves 308 and 310 to blow combustion air either through 300 or 302. As shown combustion air is blown by blower B through side 302 and thus the temperature of walls W at the inlet end 312 is high (1100° C. in this example) and at the other end 314 the temperature of the exhaust gas is low (200° C. in this example) having been cooled by the combustion air flowing through pipes 302.

In the other half 300 the respective air temperatures are high at 316 (1100° C.) and lower at 318 (600° C.) but this lower temperature is considerably higher than at 314. Thus if valves 310 and 308 are now switched over the combustion air will be heated more strongly because it will commence at 600° C. and finish at 1100° C. rather than commencing at 200° C. Thus by alternating at intervals the outlet combustion air can be maintained at a fairly high temperature compared to the system in FIG. 1 which would correspond to one half (e.g. 300) only of this embodiment.

The "twin" system may be used to advantage in the event that the hot flue gases HFG suddenly cool down as for example when a furnace is loaded with new scrap. It is at this time that the burner requires the most heat and with suitable controls the combustion air can be diverted from for example path 302 to path 300. Even though the temperature of the flue gas at 316 will be reduced at least initially the walls W will be at 1100° C. and at 318 at 600° C. thereby providing hotter combustion air than would have been possible via path 302.

Figure 7:
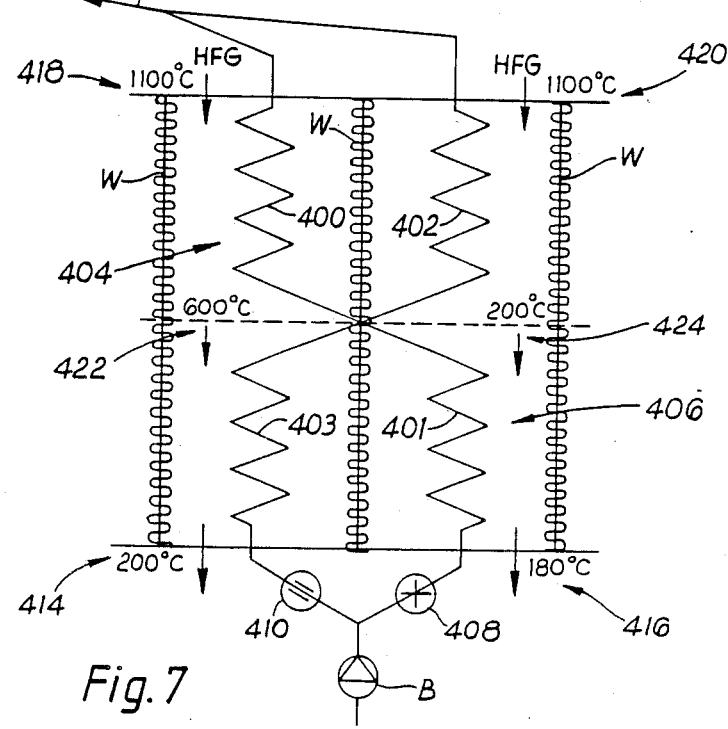
FIG. 7 shows, diagrammatically a portion of a third design of heat regenerator according to the present invention.

With reference now to FIG. 7 a further modification is shown in which each pipe 400, 402 is effectively in two joined sections 400 and 401 and 402, 403 which as shown run through the respective passages 404, 406. The cross over links may be external to the heat exchanger chambers.

As with the arrangement of FIG. 6 under suitable control the combustion air may flow through either pipes 400, 401 or 402, 403 by use of valves 408, 410. As presently shown valve 408 is closed and 410 is open therefore blower B blows combustion air for a burner through pipe section 403 and into section 402 before being fed via pipe 412 to a burner.

The temperatures (which are exemplary) are shown and it can be seen that at the "bottom" end 414, 416 the temperatures are roughly equal (200° C. and 180° C.) and at the "top" end 418, 420 they are equal to the hot flue gas HFG temperature of 1100° C.

In the centre however there is a large difference between the temperature at 422 (600° C.) and that at 424 (200° C.) because of the cooling effect of the combustion air.

Again as in FIG. 6 if the temperature of the hot flue gases HFG cools then it is possible to provide further heat for the combustion air by switching over valves 408 and 410.

The advantage of the arrangement of FIG. 7 is that the exhaust gases at 414, 416 are substantially at the same lower temperature and thereby more heat is extracted by this embodiment when compared to that in FIG. 6 because in FIG. 6 some flue gases are output from the regenerator at 600° C.

I claim:

1. A heat regenerator for the extraction of heat from hot exhaust gases and the transference of that heat to a fluid comprising:

first and second chambers, each of said chambers comprising an inlet end for the inflow of said exhaust gases, an outlet end for the outflow of said exhaust gases, and a wall means extending between said inlet and outlet ends; with said wall means being at least partially comprised of a heat resistant material;

first and second path means through which said fluid passes, each of said path means comprising an inlet means for said fluid, an outlet means for said fluid and a pipe means extending between said inlet and output means;

with each of said path means passing at least partially through each of said chambers, and valve means for diversion of said fluid to either first or second of said path means for the passage of said fluid therethrough;

wherein said wall means of said first and second chambers is corrugated to accommodate said path means.

2. A heat regenerator as claimed in claim 1 in which the pipe means is constructed from a series of pipe sections which are joined to form a continuous pipe.

3. A heat regenerator as claimed in claim 2 in which each section comprises an inner pipe member open at one end into an outer pipe member, which outer pipe member at least within the chamber is constructed from heat resistant and heat conductive material.

4. A heat regenerator as claimed in claim 1 in which said path means comprises a plurality of different grades of heat resistant and heat conductive material with the highest grade for heat resistance being at the inlet end of said chamber.

* * * * *